(No Model.)
W. M. RUSSELL.
PULVERIZER AND BLOWER.
No. 551,097. Patented Dec. 10, 1895.
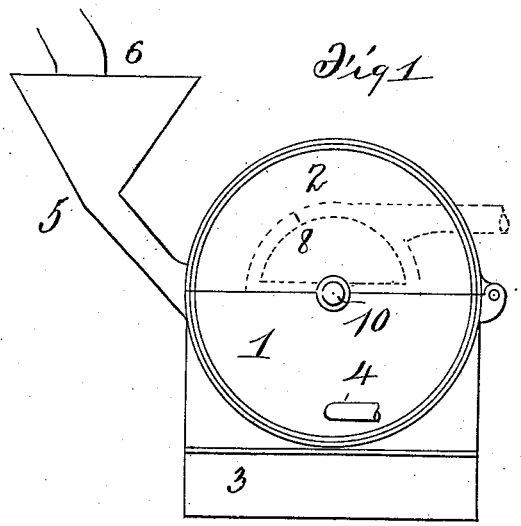
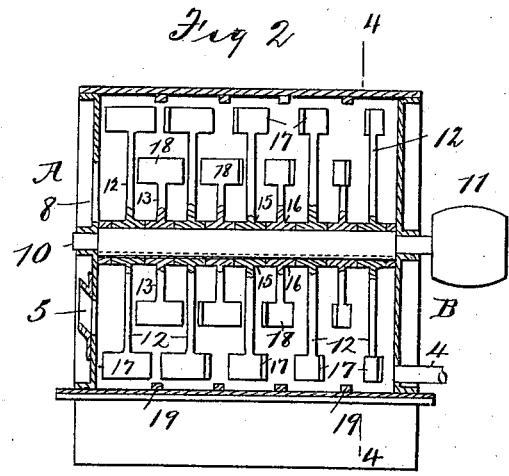
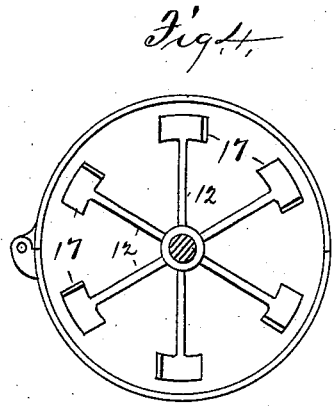
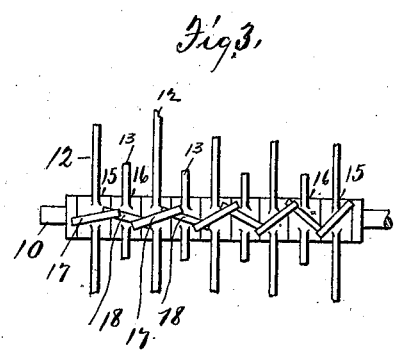
WITNESSES:
C. W. Benjamin
Kate Daly
INVENTOR
Wm. M. Russell
BY T. F. Bourn
his ATTORNEY
ANDREW B.GRAHAM. PHOTO-LITHO. WASHINGTON, D.C.

ical cities

UNITED STATES PATENT OFFICE.

WILLIAM M. RUSSELL, OF NEW YORK, N. Y.

PULVERIZER AND BLOWER.

SPECIFICATION forming part of Letters Patent No. 551,097, dated December 10, 1895.

Application filed May 31, 1895. Serial No. 551,177. (No model.)

*To all whom it may concern:*

Be it known that I, WILLIAM M. RUSSELL, a citizen of the United States, and a resident of New York city, county and State of New York, have invented certain new and useful Improvements in Pulverizers and Blowers, of which the following is a specification.

My invention relates to a machine for dividing fuel into a fine condition or pulverizing it, while at the same time intimately mixing it with the requisite amount of air to enable the fuel to be consumed in the most advantageous manner, and for finally forcing the mixture of fuel and air from the machine into a combustion-chamber.

In carrying out my invention I provide a novel pulverizer, the operative parts of which are so arranged as to pulverize fuel and draw in the proper amount of air to mix it with the fuel being pulverized, the said operative parts of the pulverizer which act to pulverize the fuel at the same time acting to create air-currents to force the mixture of fuel and air into a combustion-chamber. This pulverizer embraces a casing and a series of rotative blades or bats within it, which are so arranged as to toss the fuel about within the casing, while at the same time creating rotary currents of air within the casing which act to pulverize the fuel by attrition, the said blades or bats also acting to pass the fuel along from the intake end of the casing to the outlet, the fuel being in a state of suspension within the casing while it is being pulverized.

The invention also consists in the novel details of improvement and the combinations of parts that will be more fully hereinafter set forth, and then pointed out in the claims.

Reference is to be had to the accompanying drawings, forming part hereof, wherein—

Figure 1 is an end elevation of my improved pulverizer. Fig. 2 is a vertical section thereof. Fig. 3 is a detail view, partly broken, showing the arrangement of the blades or bats by which they are enabled to pulverize the fuel and also create such currents of air as will gradually carry the fuel along within the casing and force it therefrom. Fig. 4 is a cross-section on the plane of the line 4 4 in Fig. 2.

In the accompanying drawings, in which similar numerals and letters of reference indicate corresponding parts in the several views, the numeral 1 indicates a casing, preferably cylindrical, having a hinged top 2 to permit access to the interior, the casing being supported by legs 3 or in any suitable manner.

4 is an outlet for the casing located on its lower side at the forward or delivery end.

The opposite end of the casing 1 is connected with a hopper or spout 5, which receives fuel from a suitable receptacle (not shown) and chute 6. At the intake end of the casing 1 is an opening 8 for the entrance of air.

The opening 8 may be connected by a pipe with a hot-air chamber in the brickwork of a boiler-setting or other source of air-supply to enable air to be taken into said casing.

Within the casing 1 is a horizontal shaft 10, carried in suitable bearings and having a pulley 11 by which it can be rotated by a belt from a suitable source. Rigidly mounted upon the shaft 10 are a series of arms 12 13. The arms 12 extend outwardly nearly to the casing, while the arms 13 are shorter and are located between the arms 12, as in Figs. 2 and 3. The arms 12 13 are shown carried by hubs or sleeves 15 16, mounted on the shaft 10 and secured thereto by splines, screws, or other desired holding means. On the outer ends of the arms 12 13 are blades or bats 17 18, which consist of flat plates suitably secured to said arms. The plates or blades 17 18 are shown in rectangular form, the inner edges of which are placed at an angle to the axis of the shaft 10, so that they diverge outwardly from a line parallel with the shaft 10 from the back or inlet end A of the casing 1 toward the delivery or front end B of the casing.

The arms 12 13 are arranged in series radially around the shaft 10, there being, for instance, six of said arms in each series. The angles of divergence of the series of blades or bats 17 18 differ, ranging from the back A to the front B of the casing—that is to say, the angles of divergence of one series of blades 17 are different from the angles of divergence of the next series of blades 17, and so on, the angles of divergence of blades 18 likewise differing from the angles of divergence of said blades, increasing from the back A to the front of the casing, as shown in Fig.

3. The angles of divergence of the inner blades or bats 18 are the reverse of the angles of the blades or bats 17—that is to say, they diverge outwardly from the back A to the front of the casing toward the opposite side of the axis of the shaft 10. Arms 12 and 13 project outwardly from the shaft 10 substantially in line, so that the blades or bats 18 will be in line with the corresponding blades or bats 17, only nearer the shaft 10, as shown, whereby lines of blades or bats are formed having different and reverse angles on the same side of the shaft 10. The arms 12 13 and blades or bats 17 18 rotate together or in the same direction and the blades or bats 17 act to draw in air, and on account of the increasing angles of divergence of said blades the air is gradually forced forward and out of the delivery end of the casing, rotary currents of air being thereby created within said casing. The blades or bats 18, being placed reversely to the blades 17, also create currents of air; but these latter currents are the reverse of those created by the blades 18, whereby cross rotary air-currents are created within the casing 1.

The operation of the pulverizer and blower is as follows: The shaft 10 is rotated and the fuel is fed into the casing 1, the fuel preferably consisting of fine coal or dust. The fuel is met by the first series of blades 17 at the back A of the casing and is struck a sharp blow by them, which tosses it against the next series of blades of bats 18, which act to drive part of the fuel back against the blades 17, which again toss the fuel forward, and so on. As a circulation of air is induced by the rotating blades or bats from the back A of the casing toward the front B thereof, the fuel will be gradually carried forward, the air-currents from the blades 17 being stronger than those from the blades 18. The second series of blades or bats 17 also act to toss the fuel forward, the corresponding series of blades 18 tossing some of it backward, and so on, as the blades encounter the fuel, gradually carrying it toward the front B of the casing, the bats 18 particularly serving to strike the larger particles of fuel as they drop inwardly to drive them back against the bats 17. This continued tossing of the fuel from one blade or bat to and against the next gradually pulverizes the fuel until it issues from the casing in a finely-divided state, the attrition of the blades on the fuel, as well as one particle of fuel against another, further serving to crush or divide it. The cross-currents of air within the casing also serve to toss the fuel back and forth with such rapidity as to thoroughly disintegrate it. The farther the fuel passes from the back A to the front B of the casing the finer it becomes, and therefore the more readily the current of air in the casing can carry the fuel along to deliver it. The whirling of the fuel within the casing and the current of air passing therethrough, together with the moving blades, causes the fuel to remain in suspension, so that it will at all times be in a position to be struck by the blades or bats as well as ground one particle against another. On account of the outward and forward divergence of the bats 17 the lighter fuel is continually thrown forward until when it reaches the front B of the casing it is forced through the outlet; but this will not occur until it is in the desired finely-divided state. This whirling of the fuel also intimately mixes it with the air in the casing, so that when it passes through the outlet it is properly mixed with the air to permit of its ready ignition in a combustion-chamber. The increasing angles of blades or bats 17 also act to create a strong outward current of air at the delivery end of the casing, so that by the time the fine fuel reaches the outlet end of the casing the last series of blades create such a current of air as will forcibly pass the mixture of fine fuel and air from the casing. Thus the blades or bats serve the several purposes of pulverizing the fuel, mixing it with the proper quantity of air, and forcing it from the casing when it has arrived at the proper degree of fineness, until which time the fuel is held in suspension and continually whirled around in the casing, so that if it is not in the proper condition for ready and quick ignition it will not be delivered from the casing.

If desired, the blades or bats 18 could be omitted and only the blades 17 used. On the inner surface of the casing I also, by preference, place ribs 19, against which the fuel can strike as it is propelled through the casing; but these ribs do not form chambers in which the blades rotate, as they are outside of the ends of the blades, and therefore do not obstruct the free passage of the fuel through the casing.

Having now described my invention, what I claim is—

1. A pulverizer consisting of a casing a shaft therein, and blades or bats carried by said shaft and placed at angles laterally to the axis of said shaft, the angles of divergence of said blades gradually increasing from one end of the shaft toward the other, and other blades or bats carried by said shaft and placed at reverse angles to said first mentioned blades or bats, substantially as described.

2. A pulverizer consisting of a casing and a shaft therein, and blades or bats carried by said shaft, and placed at gradually increasing angles relatively to the axis of said shaft, the angles of said blades or bats increasing from the inlet end of said casing to its outlet end, combined with a series of annular ribs within said casing, the inner surfaces of said ribs lying outside of the outer edges of the blades to form a space between the ribs and blades for the passage of material and air, said ribs acting to retard the flow of the material, substantially as described.

3. A pulverizer consisting of a casing having a rotative shaft and two sets of blades or bats carried thereby, one set of said blades or bats being placed at angles to the longitudinal axis of said shaft, the angles of divergence of said blades gradually increasing from one end of the shaft to the other, the other set of blades or bats being placed at angles to the longitudinal axis of said shaft and on the opposite side thereof, the angles of divergence of said blades or bats gradually increasing from one end of the shaft to the other, substantially as described.

WILLIAM M. RUSSELL.

Witnesses:
T. F. BOURNE,
MOSES S. OKUN.